G. H. SOULE.
MAPLE SAP EVAPORATOR.
APPLICATION FILED NOV. 16, 1911.

1,049,935.

Patented Jan. 7, 1913.
3 SHEETS—SHEET 1.

WITNESSES

INVENTOR
George H. Soule
BY
ATTORNEYS

G. H. SOULE.
MAPLE SAP EVAPORATOR.
APPLICATION FILED NOV. 16, 1911.

1,049,935.

Patented Jan. 7, 1913.

3 SHEETS—SHEET 3.

WITNESSES
G. Robert Thomas
Rev. J. Hoster

INVENTOR
George H. Soule
BY
ATTORNEYS

UNITED STATES PATENT OFFICE.

GEORGE H. SOULE, OF FAIRFIELD, VERMONT.

MAPLE-SAP EVAPORATOR.

1,049,935.

Specification of Letters Patent.

Patented Jan. 7, 1913.

Application filed November 16, 1911. Serial No. 660,608.

*To all whom it may concern:*

Be it known that I, GEORGE H. SOULE, a citizen of the United States, and a resident of Fairfield, in the county of Franklin and State of Vermont, have invented a new and Improved Maple-Sap Evaporator, of which the following is a full, clear, and exact description.

The object of the invention is to provide a new and improved maple sap evaporator, arranged to maintain a uniform shallow depth of the boiling liquid in the heater and evaporating pan, to permit convenient access to the parts for removal of the scum and other impurities, to provide a large heating surface with a view to insure evaporation of the sap with intense heat and consequent saving of time and fuel, and to prevent the adhesion of malate of lime to the syrup compartments.

For the purpose mentioned, use is made of a heater, a pan adjacent to the heater and having a tortuous passage extending from one side at the rear to the front and back to the rear at the other side, inlet connections connecting the heater with the pan at both sides and at the rear of the pan, means for closing either connection and syrup outlets on the pan adjacent to the said inlets.

A practical embodiment of the invention is represented in the accompanying drawings forming a part of this specification, in which similar characters of reference indicate corresponding parts in all the views.

Figure 1:
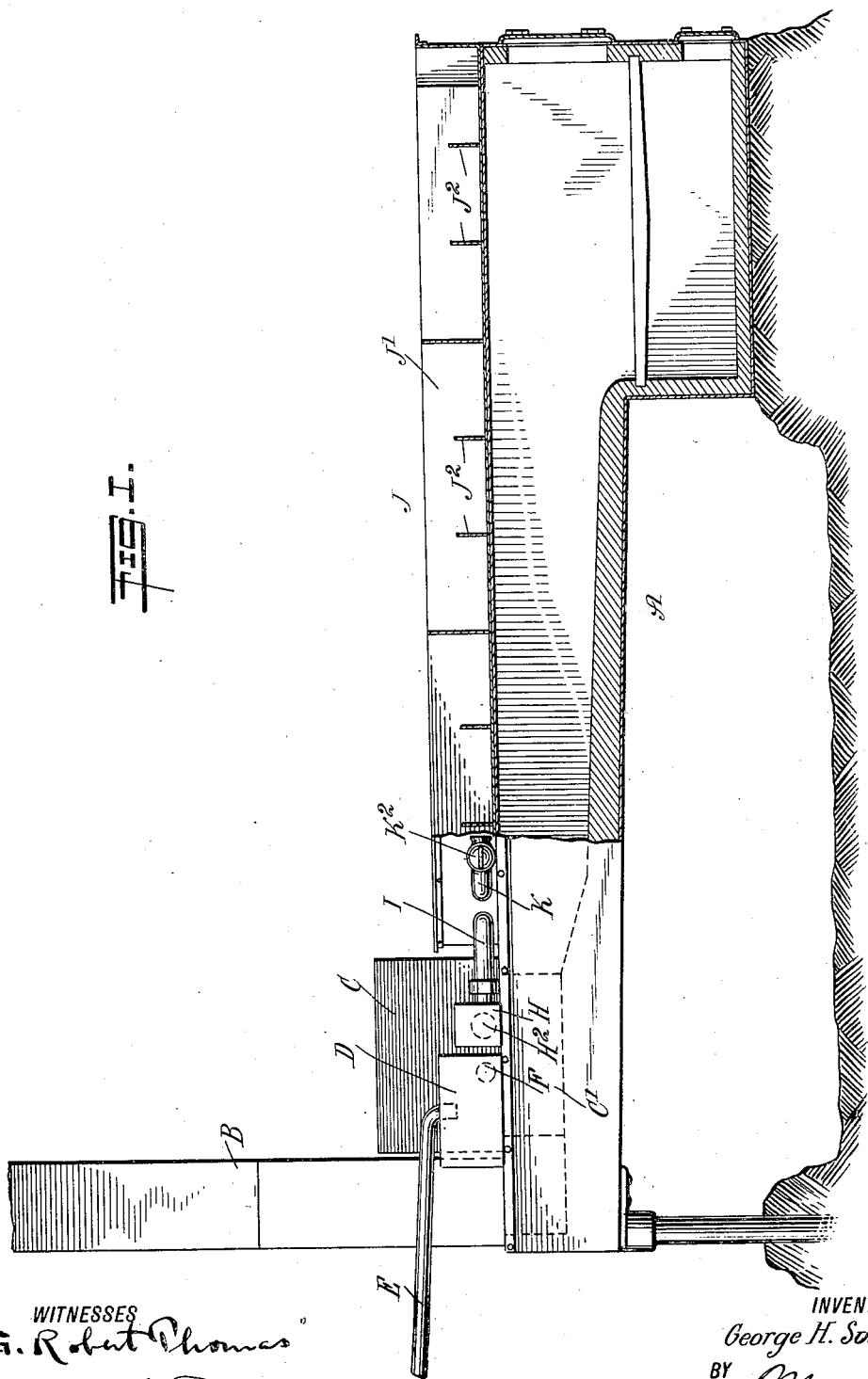
Figure 2:
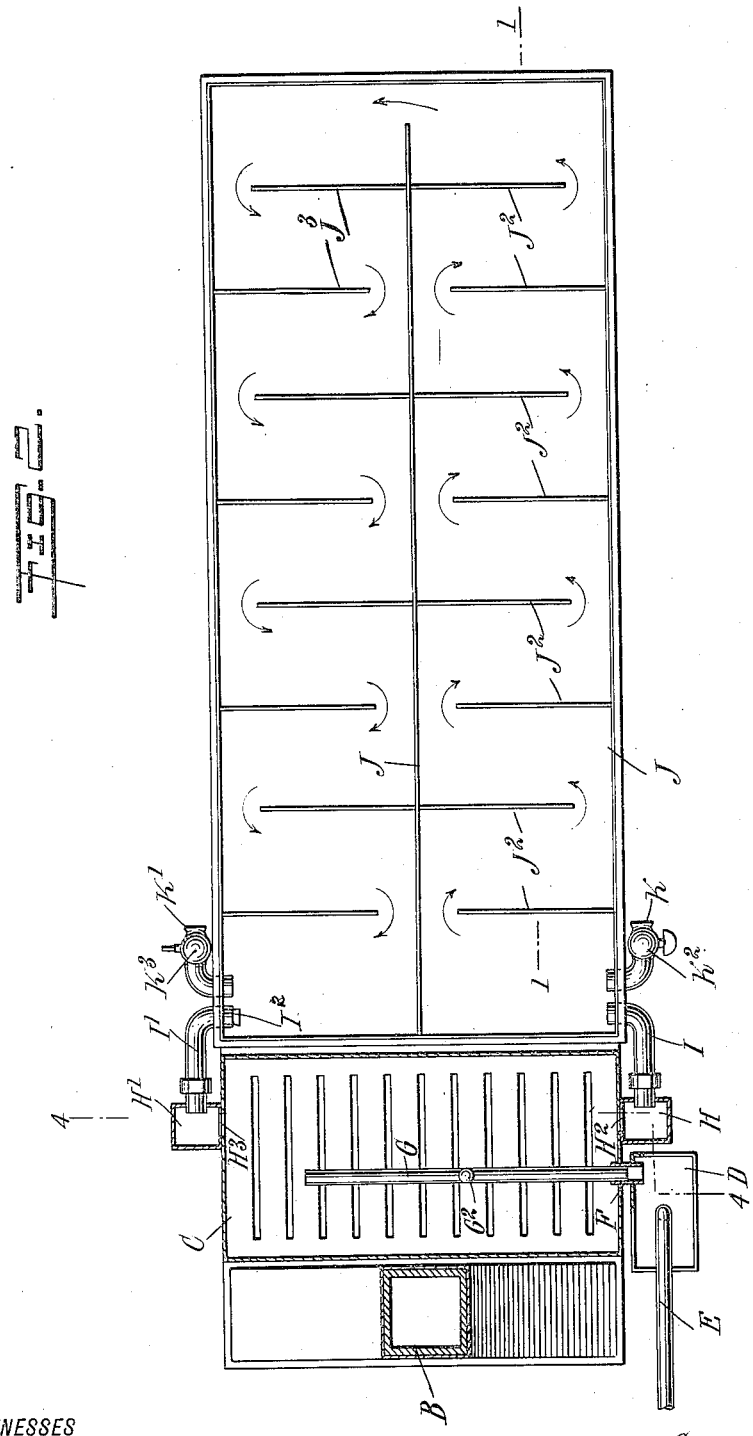
Figure 3:
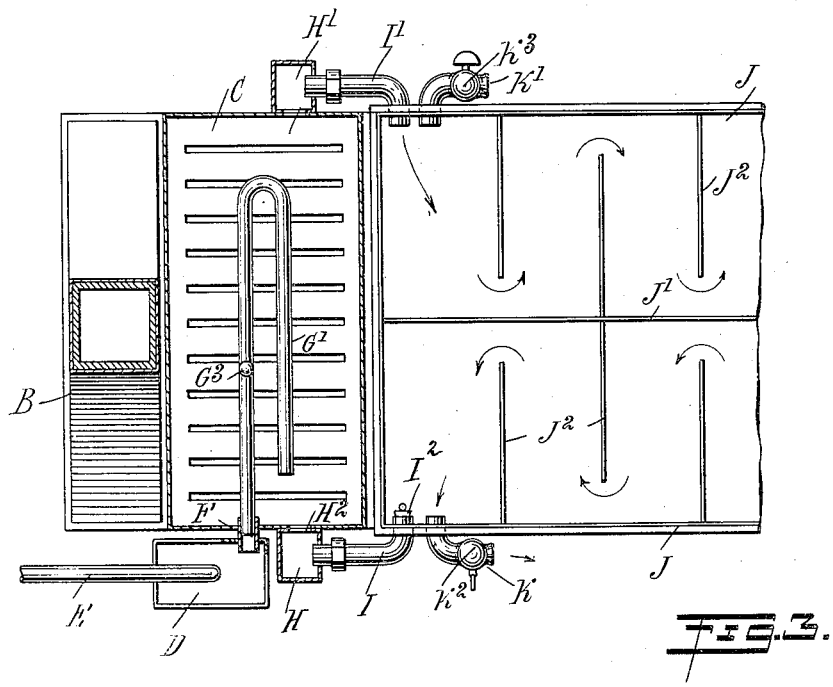
Figure 4:
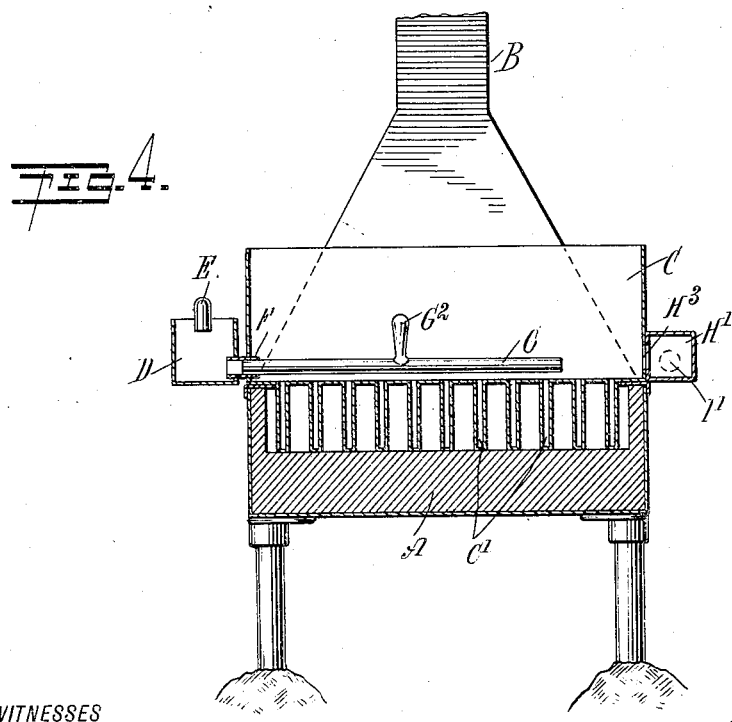

Figure 1 is a side elevation of the maple sap evaporator with parts of the furnace and pan shown in section on the line 1—1 of Fig. 2; Fig. 2 is a plan view of the same with parts in section; Fig. 3 is a similar view of the same and showing the flow of the sap in a direction opposite to the one illustrated in Fig. 2; and Fig. 4 is a cross section of the same on the line 4—4 of Fig. 2.

Experience has demonstrated that the prime requisites in evaporating maple sap into syrup of high quality and legal weight demand rapid and shallow boiling with a minimum quantity of sap in the evaporator, and it is also required that the compartments of the evaporating apparatus shall be free and open for convenience in skimming the scum or other impurities that become cohesive in the boiling sap. It is also desirable that some means be provided to prevent the accumulation of malate of lime on the metal in the syrup compartments and which accumulation causes scorching of the syrup and consequently impairs the maple flavor and color.

The apparatus presently to be described in detail provides means to permit the production of a faultless syrup in a comparatively short time and with considerable economy in the use of the fuel.

On the rear end of the furnace A adjacent to the smoke stack B is set a heater C, and adjacent to one side of the said heater C is arranged a regulator D into which discharges the supply pipe E for supplying the regulator D with the sap to be evaporated. The heater C and the regulator D are in the form of boxes open at the top, and the heater C is provided at the bottom with depending pockets C' reaching to the bottom of the furnace A, the pockets being spaced apart in a transverse direction to form longitudinal spaces or passageways for the heat arising from the burning fuel in the furnace E and passing to the smoke stack B.

The regulator D is provided with a transverse nipple F which extends through the side of the heater C into the latter, and the said nipple is adapted to receive either delivery pipe G or G' for delivering the sap from the regulator D to either side of the heater C. The delivery pipe G is a straight pipe extending from the nipple F to within a short distance of the right-hand side of the heater C, as plainly indicated in Figs. 2 and 4, and the delivery pipe G' is provided with a return bend, as indicated in Fig. 3, so as to deliver the sap to the left-hand side of the heater C. The delivery pipes G and G' are provided with upwardly-extending handles $G^2$, $G^3$, to permit of conveniently placing either pipe in position in the heater C and engaging the corresponding pipe with the nipple F.

On the opposite sides of the heater C are arranged boxes H, H' in communication with the interior of the heater by apertures $H^2$, $H^3$, and the said boxes H and H' are connected by inlet pipes I and I' with the rear and at opposite sides of a pan J set on top of the furnace A adjacent to the heater C, as plainly indicated in the drawings. The bottom of the pan J is approximately on a level with the bottom of the heater C, and the pan J is provided at its middle with a longitudinal partition J' reaching from the back wall of the pan to within a short distance of the front wall of the pan to form two compartments connected with each other at the front end of the pan. Each compartment is provided with transversely-extending partitions $J^2$ extending alternately from the sides of the pan J and the partition J' so as to form tortuous passages in both compartments to permit the sap to flow from the rear end adjacent to one side of the pan to the front thereof and back to the rear at the other side, as indicated by the arrows shown in Figs. 2 and 3. Either of the inlets I or I' is adapted to be closed by a plug $I^2$ or other suitable means, so that when the plug $I^2$ is in position on the inlet I' and use is made of the delivery pipe G then the sap passes from the regulator D to the right hand side of the heater C and then flows back to the left hand side thereof and into the box H, from which the sap passes by way of the inlet pipe I into the pan J and along the same in the direction of the arrows shown in Fig. 2. In case the plug $I^2$ is removed from the inlet I' and used on the inlet I, as shown in Fig. 3, and the pipe G is displaced by the pipe G', then the sap passes from the regulator D by way of the pipe G' to the left hand side of the heater C to then pass to the right hand side thereof and by way of the box H' and inlet pipe I' into the pan J at the rear right hand side thereof, to flow through the pan in the direction of the arrows indicated in Fig. 3. The sides of the pan J are provided near the rear ends adjacent the inlet pipes I and I' with outlet pipes K and K' having valves $K^2$, $K^3$ for closing either outlet K or K'. Now in case the pipe G and the plug $I^2$ are used as above described in reference to Fig. 2, the valve $K^2$ is closed while the valve $K^3$ is open so that the syrup on reaching the rear end of the pan J can be withdrawn therefrom by way of the open outlet K', and when the pipe G' is used and the plug K closes the inlet pipe I then the valve $K^3$ is closed and the valve $K^2$ is opened to permit of withdrawing the syrup from the rear left hand side of the pan J, as will be readily understood by reference to Fig. 3.

The pipes G and G' are submerged in the sap contained in the heater C, so that the cold sap passing from the regulator D into either pipe G or G' is preheated prior to entering the heater C and the sap in the heater C is readily brought to a boiling point owing to the heat of the furnace heating the pockets C' and the bottom of the heater C, and the heated sap readily flows into the pan J and through the same in a tortuous passage, according to which pipe G or G' is used at the time together with the plug $I^2$ closing either inlet pipe I or I' and the valve $K^2$ or $K^3$ open at the time.

It is understood that during the process of evaporation the pipes G and G' are changed as well as the position of the plug $I^2$ and the positions of the valves $K^2$ and $K^3$, so that the sap is caused to flow through the tortuous passage in the pan J but in opposite directions to prevent the formation and adhesion of malate of lime to the corresponding parts of the evaporator.

It is further understood that by arranging the nipple F, pipes G, G', the openings $H^2$, $H^3$, the inlet pipes I, I', and the outlet pipes K, K' near the bottoms of the respective parts, that is, the heater C, the boxes H and H' and the pan J, a uniform shallow depth of the sap is obtained with a view to insure evaporation of the sap with intense heat, thereby saving time and fuel.

Having thus described my invention, I claim as new and desire to secure by Letters Patent:

1. A maple sap evaporator, comprising a heater, a pan adjacent the heater and having a tortuous passage extending from one side at the rear to the front and back to the rear at the opposite side, boxes on opposite sides of the heater, and communicating with the interior thereof, inlet connections connecting the boxes with the pan at both sides of the pan at the rear thereof, means for closing either connection, outlets for syrup, a supply regulator, and delivery means extending within the heater adjacent to the bottom thereof for conducting the sap from the said regulator to the heater.

2. A maple sap evaporator, comprising a heater, a pan adjacent the heater, and having a tortuous passage extending from one side at the rear to the front and back to the rear at the other side, boxes on opposite sides of the heater and communicating with the interior thereof, inlet connections connecting the pan with the said boxes at both sides at the rear of the pan, means for closing either connection, syrup outlets on the pan adjacent the said inlets, a supply regulator at one side of the heater, and delivery means adapted to be submerged in the sap contained in the heater and leading from the said regulator for pre-heating the sap and delivering the same to the side of the heater.

3. A maple sap evaporator, comprising a furnace, a heater set on the rear end of said furnace, the bottom of the heater having depending pockets reaching to the bottom of the furnace, a regulator at one side of the heater, a supply pipe for supplying the said regulator with sap, a delivery pipe connected with the regulator and extending within the heater to discharge the sap from the regulator to the side of the heater, the said pipe extending adjacent to the bottom of the heater and adapted to be submerged in the sap contained in the heater to pre-heat the sap, a pan set on the top of the furnace adjacent the said heater and having a perfectly flat bottom throughout, the said bottom being approximately on a level with the bottom of the heater at the tops of the pockets to maintain the sap at the same level in the pan and heater, the said pan having a tortuous passage extending from one side at the rear to the front and back again to the rear at the other side, boxes on opposite sides of the heater and communicating with the interior thereof, inlet pipes connecting the said boxes with the sides of the pan at the rear thereof, means for closing either inlet pipe, and valved outlets for discharging the syrup from either side of the pan at the rear thereof.

4. A maple sap evaporator, comprising a furnace, a heater set on the rear end of said furnace, a pan set on the furnace adjacent the heater and having a tortuous passage extending from one side at the rear to the front and back to the rear at the other side, the bottom of the heater having depending pockets, and the bottom of the pan being approximately at the same level with the bottom of the heater at the top of the pockets, a supply regulator for the sap adjacent the heater, and communicating with the interior thereof, inlet connections leading from opposite sides of the heater and connected with the sides of the pan at the rear thereof, outlets for the syrup at the opposite sides of the pan adjacent the said inlets and means for closing either of said inlets and either of said outlets, so that the direction of the flow of sap from the heater through the pan can be reversed, the inlet on one side being open when the outlet at the opposite side is open to cause the sap to enter and leave the pan at opposite sides.

In testimony whereof I have signed my name to this specification in the presence of two subscribing witnesses.

GEORGE H. SOULE.

Witnesses:
W. H. FAIRCHILD,
J. H. MEEHAN.